US012766612B2

(12) United States Patent
Allen et al.

(10) Patent No.: US 12,766,612 B2
(45) Date of Patent: Oct. 20, 2026

(54) SELF-FEED DRILL BIT

(71) Applicant: MILWAUKEE ELECTRIC TOOL CORPORATION, Brookfield, WI (US)

(72) Inventors: Douglas W. Allen, Oconomowoc, WI (US); Richard A. Hohnl, Jr., Racine, WI (US); Zachary M. McMahon, Wauwatosa, WI (US); Jacob A. Krabbe, Milwaukee, WI (US); James J. Van Essen, Hales Corners, WI (US); Praneeth Gandi, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 495 days.

(21) Appl. No.: 18/464,376

(22) Filed: Sep. 11, 2023

(65) Prior Publication Data

US 2024/0083066 A1 Mar. 14, 2024

Related U.S. Application Data

(60) Provisional application No. 63/404,988, filed on Sep. 9, 2022.

(51) Int. Cl.
*B23B 51/04* (2006.01)
*B27G 15/00* (2006.01)

(52) U.S. Cl.
CPC .............. *B23B 51/04* (2013.01); *B27G 15/00* (2013.01)

(58) Field of Classification Search
CPC . B23B 51/04; B23B 51/0413; B23B 51/0426; B23B 2226/61; Y10T 408/9065; Y10T 408/909; Y10T 408/90; Y10T 408/901; B27G 15/00
See application file for complete search history.

(56) References Cited

U.S. PATENT DOCUMENTS

| | | | | |
|---|---|---|---|---|
| 1,185,380 A * | 5/1916 | Davis | B23B 51/04 | 408/205 |
| 3,543,820 A * | 12/1970 | Tulumello | B27G 15/00 | 408/199 |
| 4,079,766 A * | 3/1978 | Conley | B27G 15/00 | 408/214 |

(Continued)

FOREIGN PATENT DOCUMENTS

| | | |
|---|---|---|
| CN | 204413238 U | 6/2015 |
| CN | 205422545 U | 8/2016 |

(Continued)

OTHER PUBLICATIONS

Milwaukee Electric Tool Corp., "Switchblade™ Selfeed Bits," <https://www.milwaukeetool.com/Products/SWITCHBLADE-Selfeed-Bits> web page visited Sep. 12, 2023 (4 pages).

*Primary Examiner* — Nicole N Ramos
(74) *Attorney, Agent, or Firm* — Michael Best & Friedrich LLP

(57) ABSTRACT

A drill bit includes a shank defining a longitudinal axis and a cutting edge extending radially outward relative to the longitudinal axis. The cutting edge is configured to remove material from a workpiece along a cutting path during a cutting operation. The drill bit further includes a plurality of scoring elements positioned within the cutting path and configured to contact the workpiece before the cutting edge during the cutting operation.

19 Claims, 9 Drawing Sheets

(56) References Cited

U.S. PATENT DOCUMENTS

| | | | | | |
|---|---|---|---|---|---|
| 4,090,804 | A * | 5/1978 | Haley | B23B 51/0426 408/86 |
| D298,633 | S * | 11/1988 | Kenemore | D15/139 |
| 5,695,304 | A | 12/1997 | Ebert | |
| 5,975,814 | A | 11/1999 | Pomp | |
| 6,354,774 | B1 | 3/2002 | Haughton et al. | |
| 6,394,714 | B2 * | 5/2002 | Eberhard | B27G 15/00 408/211 |
| 6,612,788 | B2 | 9/2003 | Thomas et al. | |
| 6,644,899 | B2 | 11/2003 | Ebehard | |
| 6,874,978 | B2 | 4/2005 | Gongola | |
| D607,024 | S | 12/2009 | Dost et al. | |
| 7,625,160 | B2 | 12/2009 | Zeiler et al. | |
| 7,648,316 | B2 | 1/2010 | Ebert | |
| 7,661,911 | B2 | 2/2010 | Zeiler et al. | |
| 7,665,936 | B2 * | 2/2010 | Miebach | B27G 15/00 408/212 |
| 7,909,547 | B2 | 3/2011 | Jordan et al. | |
| 8,070,397 | B2 | 12/2011 | Durfee | |
| 8,070,398 | B2 | 12/2011 | Durfee | |
| 8,109,700 | B2 | 2/2012 | Jordan et al. | |
| 8,328,477 | B2 | 12/2012 | Allen et al. | |
| 8,371,777 | B2 | 2/2013 | Allen et al. | |
| 8,727,679 | B2 | 5/2014 | Evatt | |
| 9,339,874 | B2 | 5/2016 | Allen et al. | |
| 9,919,364 | B2 | 3/2018 | Allen et al. | |
| 10,166,608 | B2 | 1/2019 | Little | |
| 10,368,880 | B1 * | 8/2019 | Alruhaimi | A61B 17/1637 |
| 10,618,119 | B2 | 4/2020 | Allen et al. | |
| 10,835,969 | B1 | 11/2020 | Scaglione | |
| 2012/0134760 | A1 | 5/2012 | Jordan et al. | |
| 2022/0126380 | A1 | 4/2022 | Park | |

FOREIGN PATENT DOCUMENTS

| | | | | |
|---|---|---|---|---|
| CN | 113290649 | A * | 8/2021 | B27G 15/00 |
| DE | 8808954 | U1 | 9/1988 | |
| DE | 29701161 | U1 | 5/1998 | |
| DE | 29911945 | U1 | 10/1999 | |
| DE | 202013102491 | U1 * | 6/2013 | B23B 51/0413 |
| WO | WO-2019203640 | A1 * | 10/2019 | B23B 51/0473 |
| WO | WO-2021091373 | A2 * | 5/2021 | B23B 51/0413 |

* cited by examiner

SELF-FEED DRILL BIT

CROSS-REFERENCE TO RELATED APPLICATION

This application claims priority to U.S. Provisional Patent Application No. 63/404,988, filed Sep. 9, 2022, the entire contents of which are incorporated herein by reference.

FIELD

The present disclosure relates to cutting tools and, more particularly, to self-feed drill bits.

BACKGROUND

A self-feed drill bit typically includes a shank configured for coupling to a power tool and a cutting body coupled to an end of the shank. Some self-feed drill bits further include feed screws that extend from the cutting bodies. The feed screws pull the cutting bodies into workpieces to facilitate boring holes in the workpieces.

SUMMARY

The present disclosure provides, in one aspect, a self-feed drill bit including a shank defining a longitudinal axis, and a cutting body coupled to an end of the shank, the cutting body including a plurality of cutting teeth arranged circumferentially around the longitudinal axis, a cutting edge extending radially outward relative to the longitudinal axis, and at least one scoring element adjacent the cutting edge.

Another aspect of the present disclosure provides a drill bit including a shank defining a longitudinal axis, a cutting edge extending radially outward relative to the longitudinal axis, the cutting edge configured to remove material from a workpiece along a cutting path during a cutting operation, and a plurality of scoring elements positioned within the cutting path and configured to contact the workpiece before the cutting edge during the cutting operation.

Yet another aspect of the present disclosure provides a drill bit including a shank defining a longitudinal axis, a plurality of cutting teeth arranged about the longitudinal axis, a tip coupled to the shank and configured to contact a workpiece during a cutting operation, and a plurality of scoring elements positioned radially between the tip and the plurality of cutting teeth. At least one of the plurality of scoring elements is configured to contact the workpiece before the plurality of cutting teeth during the cutting operation.

Other features and aspects of the disclosure will become apparent by consideration of the following detailed description and accompanying drawings.

Figure 1:
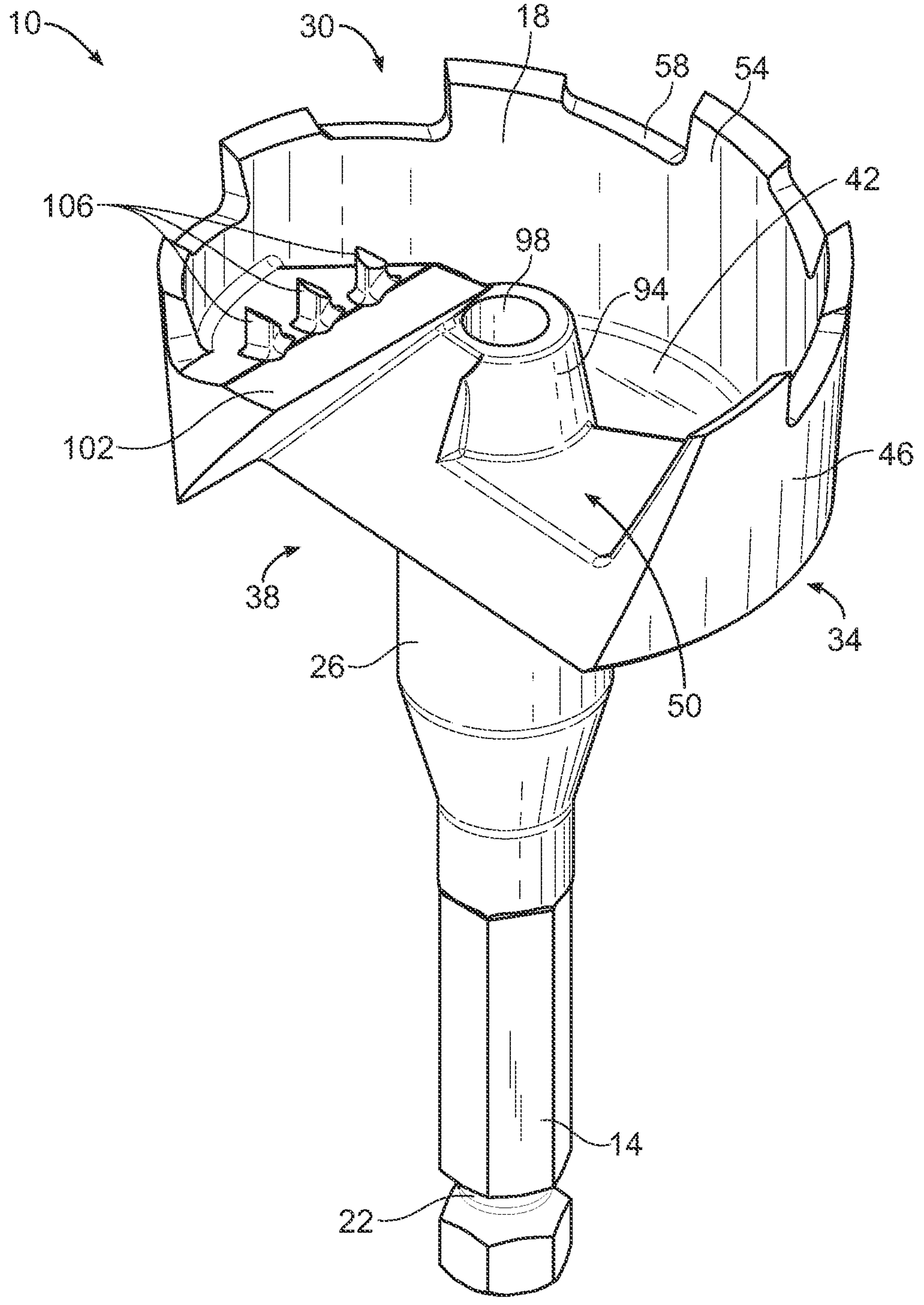
FIG. 1 is a perspective view of a self-feed drill bit in accordance with an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

Features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Terms of approximation, such as "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise. Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

DETAILED DESCRIPTION

Figure 2:
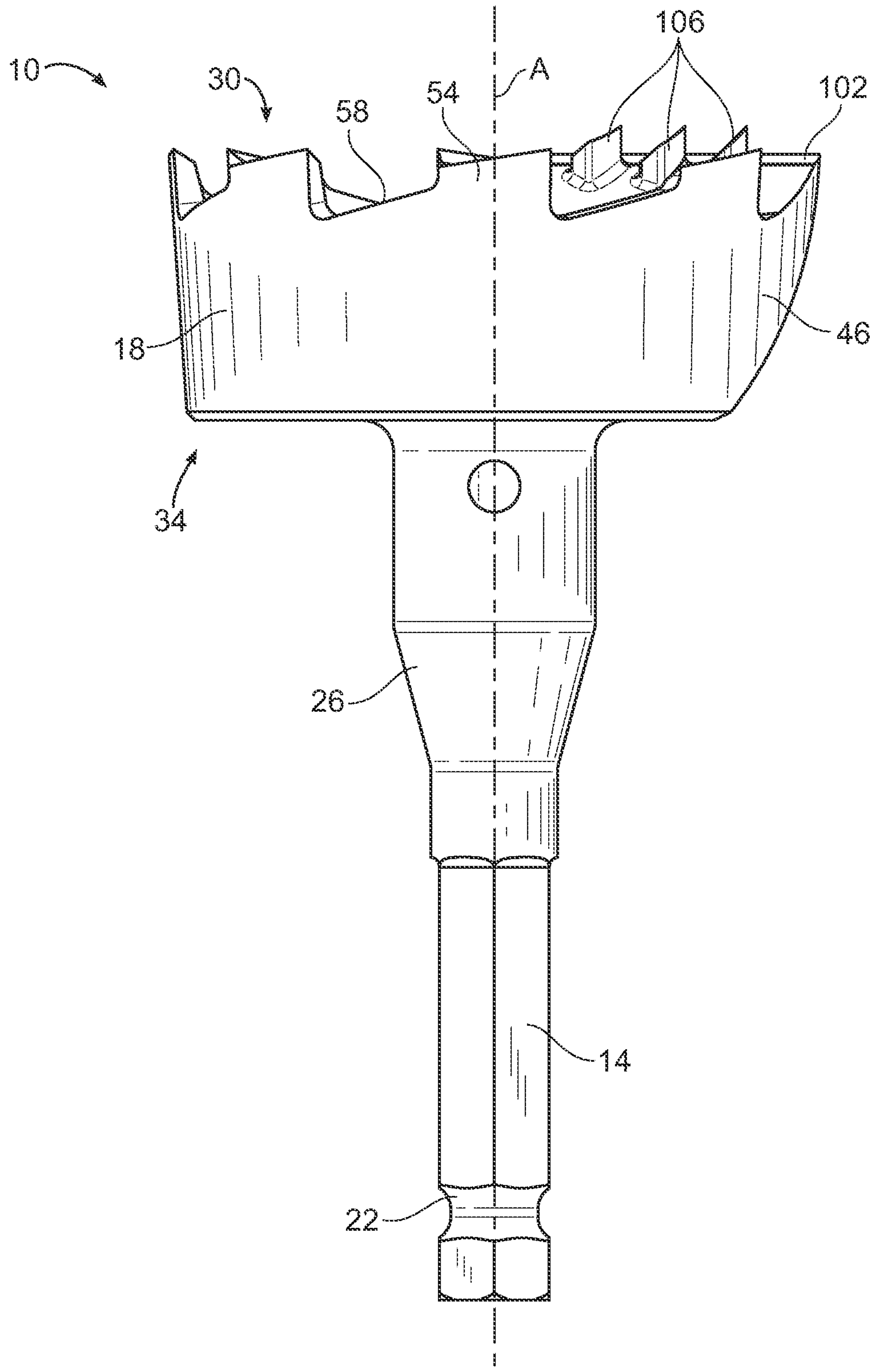
FIG. 2 is a side view of the self-feed drill bit of FIG. 1.

FIGS. 1 and 2 illustrate a cutting tool. The cutting tool, or cutting bit, is usable with a tool or power tool, such as, for example, a drill, a driver drill, an impact driver, and the like. The illustrated cutting tool is a self-feed drill bit 10. The self-feed drill bit 10 includes a shank 14 and a cutting body 18. In the illustrated embodiment, the shank 14 and the cutting body 18 are integrally formed as a single piece. In other embodiments, the shank 14 and the cutting body 18 may be separate pieces that are secured (e.g., welded, etc.) together.

The shank 14 is configured to be received in a tool holder or chuck of a tool, such as a power tool. In the illustrated embodiment, the shank 14 has a substantially hex-shaped cross-section with six flat sides and a power groove 22. In other embodiments, the shank 14 may have other cross-sectional shapes, such as, for example, round, D-shaped, round with flats, or any polygonal shape. In some embodiments, the shank 14 may be an SDS, SDS+, or SDS Max style shank. The shank 14 defines a longitudinal axis A (FIG. 2). The longitudinal axis A is the axis about with the self-feed drill bit 10 rotates during operation. The illustrated shank 14 also includes a connecting structure 26, or transition structure, positioned between the hex-shaped portion of the shank 14 and the cutting body 18. The connecting structure 26 has a different cross-sectional shape than the hex-shaped portion and generally increases in diameter toward the cutting body 18. In some embodiments, the connecting structure 26 may be omitted.

Figure 3:
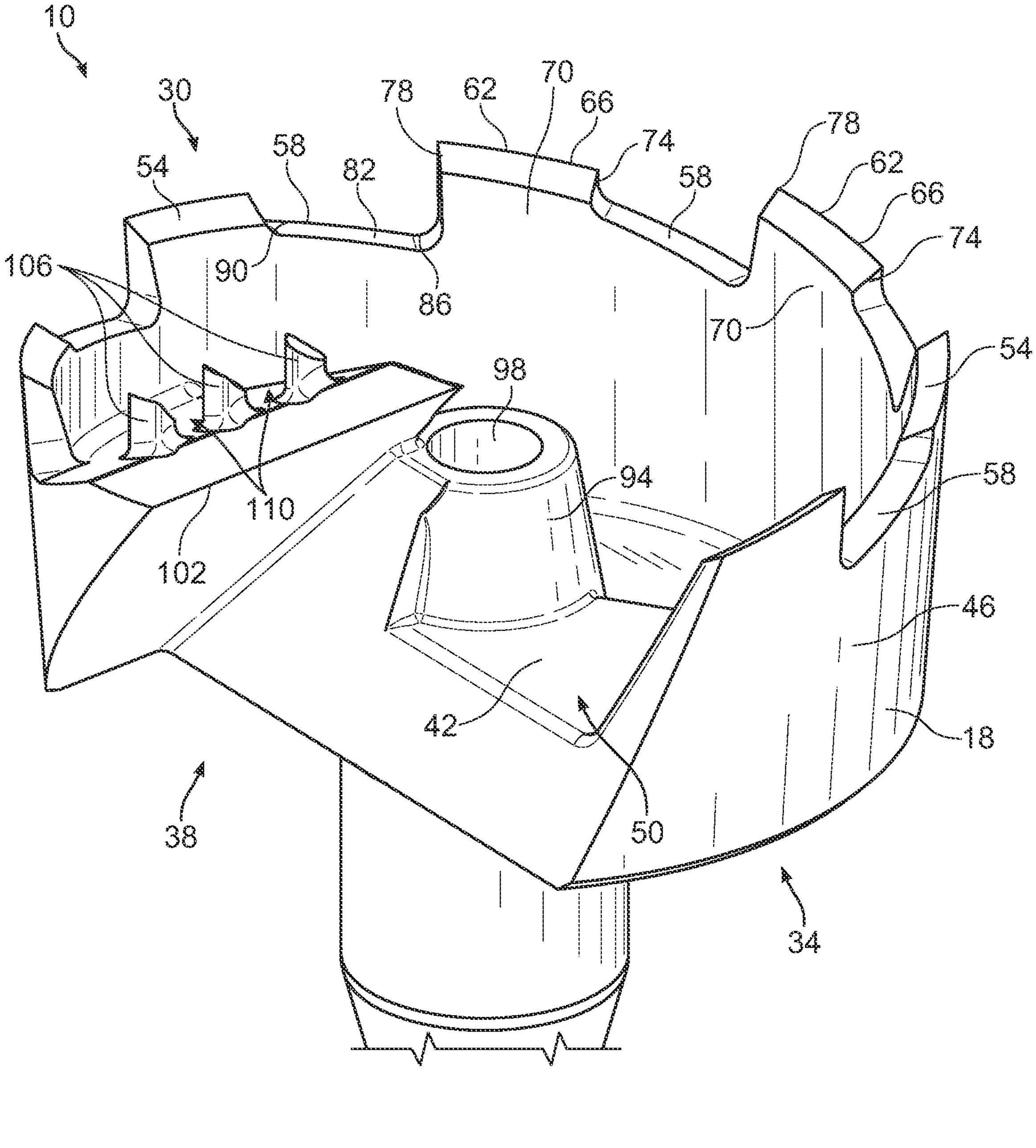
FIG. 3 is a perspective view of a cutting body of the self-feed drill bit of FIG. 1.
Figure 4:
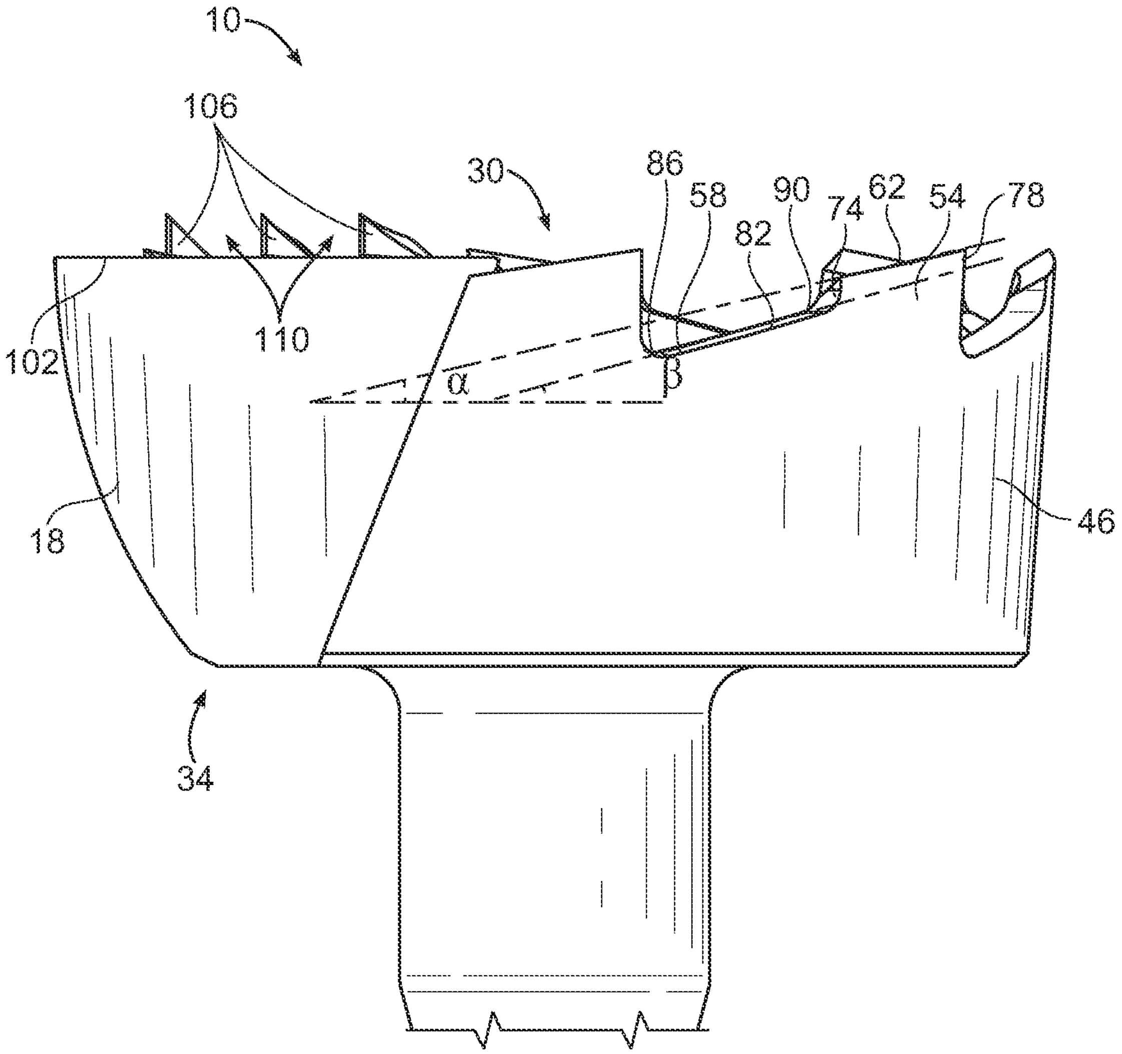
FIG. 4 is a side view of the cutting body of the self-feed drill bit of FIG. 1.
Figure 5:
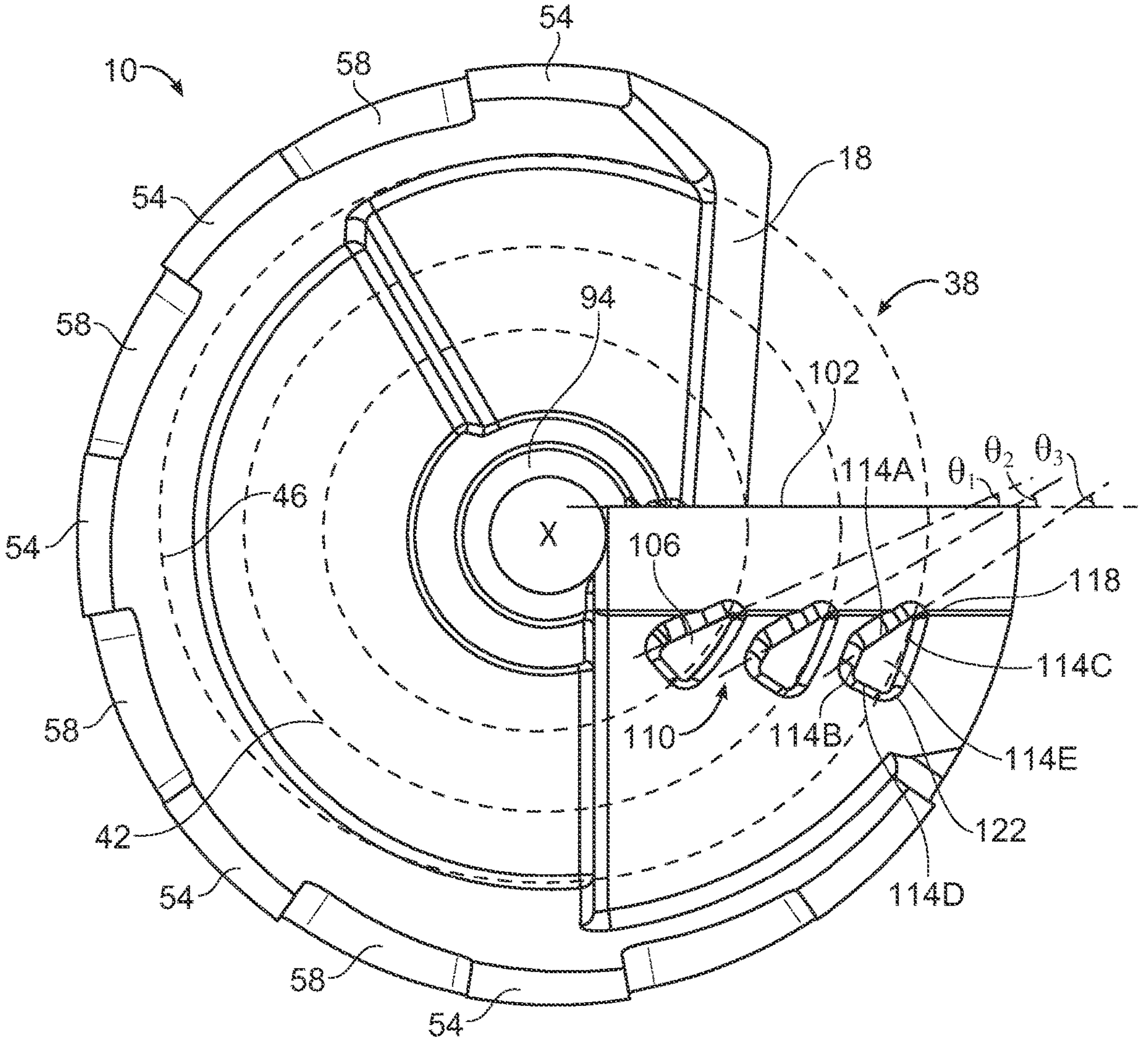
FIG. 5 is a top view of the cutting body of the self-feed drill bit of FIG. 1.

The cutting body 18 is coupled to an end of the shank 14. As shown in FIGS. 3-5, the cutting body 18 is generally cup-shaped. More particularly, the illustrated cutting body 18 is a generally cylindrically-shaped cutting body having a first or workpiece-engaging end 30 and a second or rearward end 34. The cutting body 18 extends through an arc length that is less than an entire circle. In the illustrated embodiment, the cutting body 18 extends about 270 degrees. As such, a cutout segment 38 is defined in approximately a quarter of the cutting body 18. In other embodiments, the cutting body 18 may extend through a larger or smaller arc length.

The illustrated cutting body 18 includes a base 42 and a sidewall 46. The base 42 extends generally perpendicular to the longitudinal axis A and is coupled to the end of the shank 14. More particularly, the base 42 is coupled to the connecting structure 26 of the shank 14. The base 42 defines the rearward end 34 of the cutting body 18. The sidewall 46 extends generally perpendicular from the base 42. In other words, the sidewall 46 extends parallel to or with a slight taper relative the longitudinal axis A. For example, the sidewall 46 can taper radially inwardly at about 5 degrees as the sidewall 46 extends toward the base 42. The sidewall 46 defines the workpiece-engaging end 30 of the cutting body 18. The sidewall 46 is generally cylindrical and matches the arc length of the cutting body 18. An opening 50 defined by the base 42 and the sidewall 46 is in communication with the cutout segment 38 to facilitate chip removal from the cutting body 18 during operation.

The sidewall 46 includes a plurality of cutting teeth 54 and a plurality of gullets 58. The cutting teeth 54 may also be referred to as scoring teeth or kerf cutting teeth. The illustrated cutting teeth 54 are integrally formed as a single piece with the sidewall 46. In other embodiments, the cutting teeth 54 may be or include separate pieces that are coupled to the sidewall 46. The cutting teeth 54 are arranged circumferentially around the longitudinal axis A. The cutting teeth 54 define an outer perimeter or circumference of the cutting body 18 and, thereby, the self-feed drill bit 10. The gullets 58 are positioned between adjacent cutting teeth 54. In the illustrated embodiment, the cutting body 18 includes six cutting teeth 54. In other embodiments, the cutting body 18 may include fewer or more cutting teeth 54. Additionally or alternatively, the cutting teeth 54 may have other shapes and/or configurations.

Referring to FIG. 3, in some embodiments, outer surfaces of the cutting teeth 54 are tapered or sloped to provide sharpened tooth edges 62. In the illustrated embodiment, the outer surfaces of the cutting teeth 54 are tapered or sloped from a radial outer side 66 toward a radial inner side 70 such that a raised tooth edge 62 is formed at the outer circumference of the cutting body 18. The illustrated cutting teeth 54 are additionally sloped or tapered in a circumferential direction. In the illustrated embodiment, the cutting teeth 54 slope upwardly from a trailing edge 74 of each cutting tooth 54 to a leading edge 78 of each cutting tooth 54. As such, the trailing edge 74 of each cutting tooth 54 extends a first distance away from the base 42, while the leading edge 78 of each cutting tooth 54 extends a second distance away from the base 42. The second distance is larger than the first distance. In such an embodiment, as best illustrated in FIG. 4, the tooth edge 62 of each cutting tooth 54 is oriented at an angle $\alpha$ with respect to the base 42 of the cutting body 18.

Referring now to FIG. 4, in some embodiments, such as the illustrated embodiment, a base 82 of each gullet 58 is oriented at an angle $\beta$ with respect to the base 42 of the cutting body 18. For example, a trailing or downstream end 86 of each gullet 58 is spaced a first distance from the base 42, while a leading or upstream end 90 of each gullet 58 is spaced a second distance from the base 42. The second distance is larger than the first distance. In some embodiments, the angle $\alpha$ of each tooth edge 62 is substantially equal to the angle $\beta$ of the base 82 of each gullet 58. In other embodiments, the angles $\alpha$, $\beta$ may be different.

Referring to FIGS. 1, 3, and 5, the illustrated cutting body 18 also includes a central boss 94. The central boss 94 defines a bore 98 that can receive a feed screw (such as the feed screw shown in FIGS. 7-9). The central boss 94 and the feed screw are generally aligned with the longitudinal axis A of the shank 14. The feed screw may extend from the central boss 94 axially further than the first end 30 of the cutting body 18. The feed screw also extends axially further than the leading edge 78 of each cutting tooth 54 and further than a cutting edge 102. In other embodiments, the feed screw may have other configurations, may be replaced with a different type of feed bit, or may be omitted.

The cutting body 18 also includes a cutting edge 102 extending radially outward relative to the longitudinal axis A. In particular, the cutting edge 102 extends from the central boss 94 to the outer perimeter of the cutting body 18. In the illustrated embodiment, the cutting edge 102 is integrally formed as a single piece with the cutting body 18. In other embodiments, the cutting edge 102 may be part of a separate cutting blade that is secured to the cutting body 18. In such embodiments, the cutting edge 102 may be formed of a different material than the rest of the cutting body 18. For example, the cutting body 18 may be formed of steel, while the cutting edge 102 may be formed of carbide. In some embodiments, the cutting edge 102 may be formed of high speed steel. In other embodiments, the cutting body 18 and/or the cutting edge 102 may be formed of other materials. The cutting edge 102 may be coated using various coating technologies, such as, for example, chemical vapor deposition (CVD), physical vapor deposition (PVD), and the like.

As shown in FIGS. 1-6, the cutting body 18 further includes one or more scoring elements 106. The scoring elements 106 are positioned adjacent the cutting edge 102.

More particularly, the scoring elements 106 are positioned behind, or downstream of, the cutting edge 102. The scoring elements 106 extend axially further—in a direction measured parallel to the longitudinal axis A—than the cutting edge 102. The scoring elements 106 also extend axially further than the cutting teeth 54. The cutting teeth 54 extend axially further than the cutting edge 102 by a relatively small amount, while the scoring elements 106 extend axially further than the cutting teeth 54 by a relatively large amount. The scoring elements 106 may extend axially further than the cutting teeth 54 by at least twice as far as the cutting teeth 54 extend beyond the cutting edge 102. In some embodiments, the scoring elements 106 may extend axially further than the cutting teeth 54 by about four times as far as the cutting teeth 54 extend beyond the cutting edge 102. As such, the scoring elements 106 are configured to strike and weaken relatively hard objects (e.g., nails, etc.) during cutting operations to help reduce potential damage to the cutting edge 102. In the illustrated embodiment, the cutting body 18 includes three scoring elements 106. In other embodiments, the cutting body 18 may include fewer or more scoring elements 106. The scoring elements 106 are spaced apart from each other to define channels 110 between adjacent scoring elements 106. The illustrated scoring elements 106 are separate components that are secured (e.g., welded, brazed, etc.) to the cutting body 18. In other embodiments, the scoring elements 106 may be integrally formed as a single piece with the cutting body 18.

Figure 6:
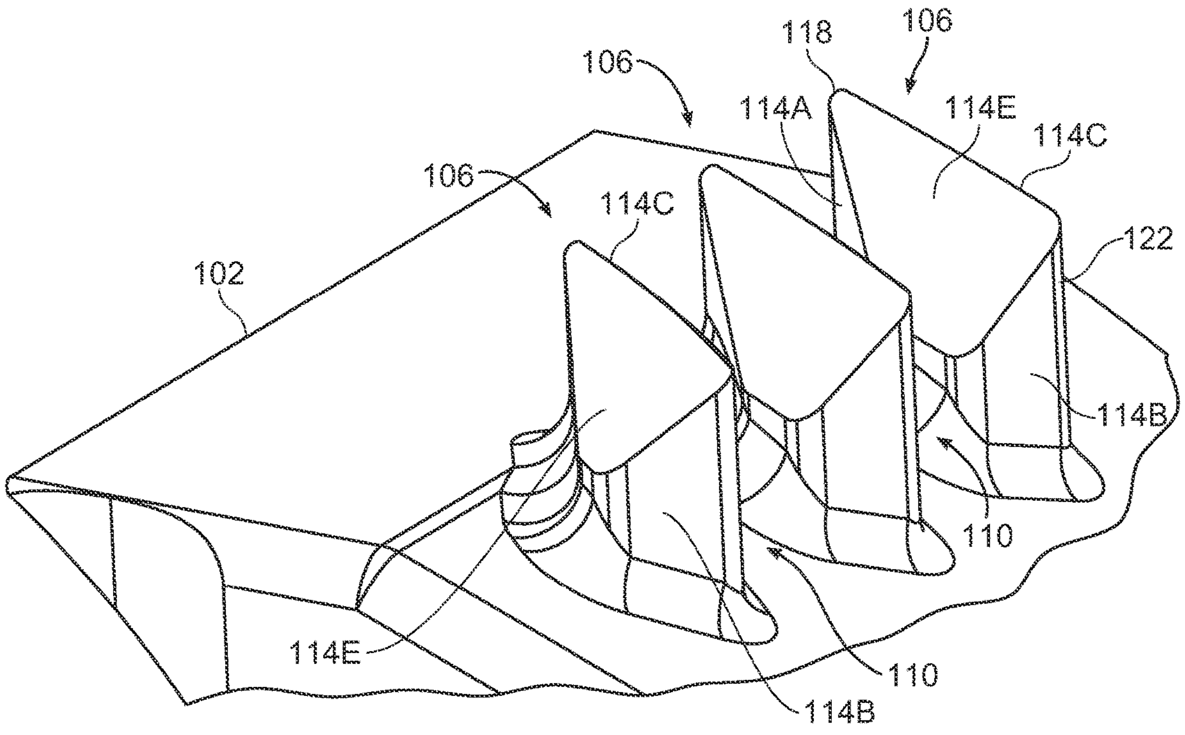
FIG. 6 is an enlarged, perspective view of scoring elements on the cutting body of FIG. 3.

Referring to FIGS. 5 and 6, each scoring element 106 includes a first leading face 114A, a second leading face 114B, a first trailing face 114C, a second trailing face 114D, and a top face 114E. The first leading face 114A and the first trailing face 114C intersect to form a leading edge 118. The first trailing face 114C and the second trailing face 114D intersect to form a trailing edge 122. In the illustrated embodiment, both the leading edge 118 and the trailing edge 122 are chamfered. The top face 114E extends across and connects the other faces 114A-D. In some embodiments, the top face 114E may be sloped. For example, in the illustrated embodiment, the top face 114E is further from the base 42 at the leading edge 118 than at the trailing edge 122. In addition, the top face 114E is closer to the base 42 at the second leading face 114B than at either the leading edge 118 or the trailing edge 122.

The first leading face 114A of each scoring element 106 is also oriented at an oblique angle with respect to the cutting edge 102. In some embodiments, the angle between the cutting edge 102 and the first leading faces 114A may vary among the scoring elements 106. For example, in the illustrated embodiment, the first leading faces 114A are angled with respect to the cutting edge 102 at angles θ1, θ2, θ3, where the angle θ3 of the scoring element 106 furthest from the center of the cutting body 18 is the largest angle, and the angle θ1 of the scoring element 106 closest to the center of the cutting body 18 is the smallest angle. The first trailing faces 114C generally align with cutting paths (identified by broken-line circles) of the scoring elements 106. As such, the trailing faces 114C provide clearance for the scoring elements 106 as the self-feed drill bit 10 is rotated and the scoring elements 106 cut into a workpiece. Moreover, in the illustrated embodiment, the dimensions of the faces 114A-E of the scoring elements 106 vary for each scoring element 106. Other embodiments may include scoring elements that differ in dimension and structure from the scoring elements 106 of the illustrated embodiment.

During operation, a user connects the shank 14 of the self-feed drill bit 10 to a power tool and positions the self-feed drill bit 10 above or in front of a workpiece. The user then centers the feed screw—or other feed bit, if present—above the intended cutting location and activates the power tool to rotate the self-feed drill bit 10 about the longitudinal axis A. As the self-feed drill bit 10 rotates, the threads of the feed screw are driven into the workpiece. The engagement between the feed screw and the workpiece draws the self-feed drill bit 10 into the workpiece.

Continued rotation of the self-feed drill bit 10 moves the scoring elements 106 into engagement with the workpiece. If the self-feed drill bit 10 encounters a harder or stronger object (e.g., nail, knot, staple, etc.) in a cutting path of the cutting edge 102, at least one of the scoring elements 106 will strike the object. Continued striking of the object by scoring elements 106 helps chip away at and weaken the object. In some instances, the object may break or be pulled out of the workpiece.

As the self-feed drill bit 10 continues to move into the workpiece, the cutting teeth 54 and the cutting edge 102 engage the workpiece. The cutting teeth 54 first score a circular path, or outer perimeter of a hole, in the workpiece. The cutting edge 102 removes material from the scored area in the workpiece by a plaining-type action. The cutting edge 102 lifts the chips apart from the workpiece and directs the chips upwardly toward the opening 50 in the cutting body 18 and away from the self-feed drill bit 10.

Figure 7:
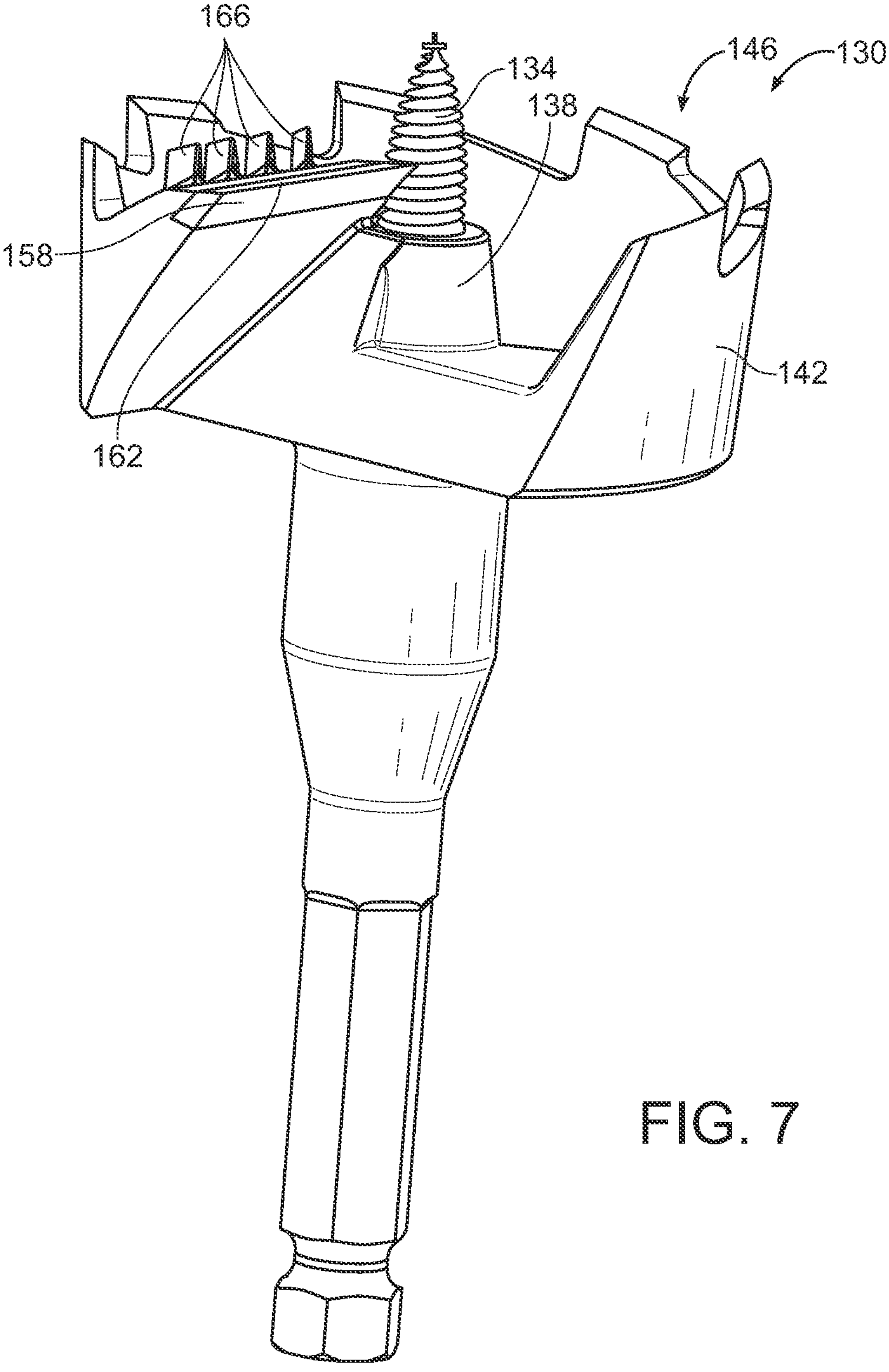
FIG. 7 is a perspective view of a self-feed drill bit in accordance with another embodiment of the disclosure.
Figure 8:
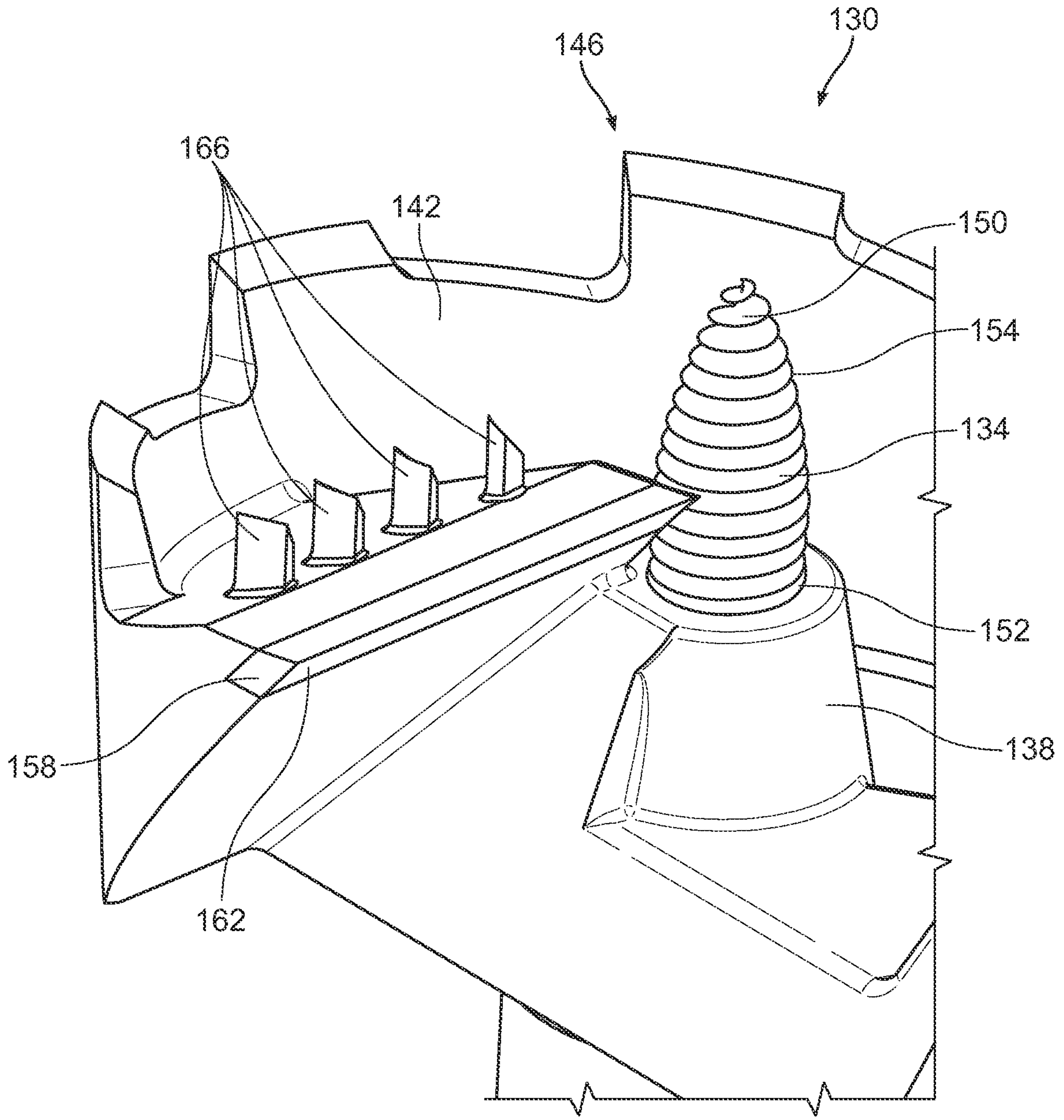
FIG. 8 is a perspective view of a portion of the self-feed bit of FIG. 7.
Figure 9:
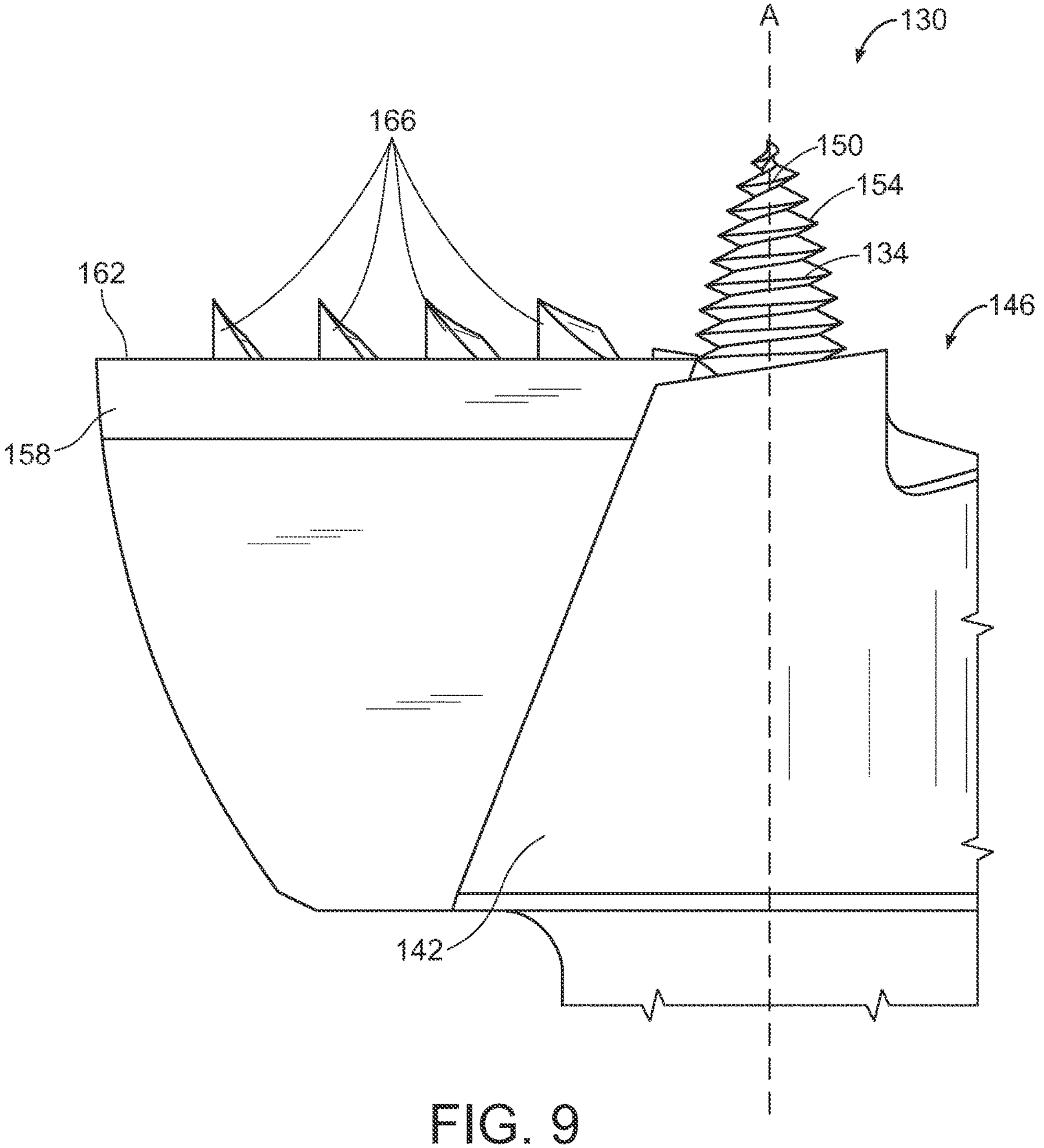
FIG. 9 is a side view of a portion of the self-feed bit of FIG. 7.

FIGS. 7-9 illustrate another cutting tool, such as a self-feed drill bit 130. The self-feed drill bit 130 is similar to the self-feed drill bit 10 described above. Reference is hereby made to the description of the self-feed drill bit 10 above for description of features and elements of the self-feed drill bit 130 not included below.

The illustrated self-feed drill bit 130 includes a feed screw 134 connected to a central boss 138 of a cutting body 142. The feed screw 134 extends from the central boss 138 axially further than a first end 146 of the cutting body 142. In the illustrated embodiment, the feed screw 134 is generally aligned with a longitudinal axis A of the self-feed drill bit 130. The feed screw 134 includes a tapered tip or first end 150 and a second end 152 opposite the first end 150. Threads 154 extend radially outward from the first end 150 and helically around the feed screw 134 for threadably engaging a workpiece. The configuration (e.g., size, shape, pitch, number, etc.) of the threads 154 and the shape or profile of the first end 150 itself may vary and may be particularly suited for particular applications (e.g., the material being cut). The second end of the feed screw 134 is received in the central boss 138. In some embodiments, the second end of the feed screw may be engaged by a set screw to secure the feed screw within the central boss. In other embodiments, the second end may be threaded, welded, or otherwise secured in the central boss 138.

The illustrated self-feed drill bit 130 also includes a blade 158 that defines a cutting edge 162. The blade 158 is separate from the cutting body 142. The blade 158 may be welded, brazed, or otherwise secured to the cutting body 142. In some embodiments, the blade 158 may be removable and replaceable. The blade 158 may be constructed of one or more materials suitable for a cutting operation including, but not limited to, low alloy and alloyed steel and non-ferrous materials and various heat-treated metals, ceramic, composite materials (including some plastics), and carbide. The blade 158 may be coated using various coating technologies, such as, for example chemical vapor deposition (CVD), physical vapor deposition (PVD), and the like.

In addition, the illustrated self-feed drill bit 130 includes four scoring elements 166 adjacent the blade 158 and the cutting edge 162. In the illustrated embodiment, the scoring elements 166 have similar shapes and sizes. In other embodiments, the scoring elements 166 may have different shapes and sizes relative to each other.

Although the disclosure has been described in detail with reference to certain preferred embodiments, variations and modifications exist within the scope and spirit of one or more independent aspects of the disclosure as described.

Various features and advantages of the invention are set forth in the following claims.

What is claimed is:

1. A self-feed drill bit comprising:

a shank defining a longitudinal axis; and a cutting body coupled to an end of the shank, the cutting body including a plurality of cutting teeth arranged circumferentially around the longitudinal axis, a cutting edge extending radially outward relative to the longitudinal axis and radially inward relative to the plurality of cutting teeth, and at least one scoring element adjacent and rotationally offset from the cutting edge, wherein the at least one scoring element extends farther than the cutting edge in a direction away from the shank and along the longitudinal axis.

2. The self-feed drill bit of claim 1, wherein the cutting edge is a carbide cutting edge.

3. The self-feed drill bit of claim 1, further comprising a feed screw extending from the cutting body along the longitudinal axis.

4. The self-feed drill bit of claim 1, wherein the cutting edge is linear and configured to remove material from a workpiece along a cutting path during a cutting operation.

5. The self-feed drill bit of claim 4, wherein the at least one scoring element is one of a plurality of scoring elements extending farther than the cutting edge in the direction away from the shank and along the longitudinal axis and configured to contact the workpiece before the cutting edge during the cutting operation.

6. The self-feed drill bit of claim 5, wherein the plurality of scoring elements is positioned radially between the shank and the plurality of cutting teeth.

7. The self-feed drill bit of claim 5, wherein the plurality of scoring elements is spaced apart along the cutting edge.

8. The self-feed drill bit of claim 7, wherein the cutting edge includes a trailing edge, and wherein at least one scoring element of the plurality of scoring elements is adjacent the trailing edge.

9. A drill bit comprising:

a shank defining a longitudinal axis;

a cutting edge extending radially outward relative to the shank and rotatable about the longitudinal axis to define a cutting path, the cutting edge including a leading edge and a trailing edge rotationally offset relative to the leading edge, the cutting edge configured to remove material from a workpiece along the cutting path during a cutting operation, during which the cutting edge is rotated through the cutting path and translated axially along the longitudinal axis; and a plurality of scoring elements positioned along the trailing edge radially and circumferentially within the cutting path and extending farther than the cutting edge in a direction away from the shank and along the longitudinal axis to contact the workpiece before the cutting edge during the cutting operation.

10. The drill bit of claim 9, wherein each scoring element of the plurality of scoring elements is equidistantly spaced from the cutting edge.

11. The drill bit of claim 9, wherein the shank is rotatable in a cutting direction, and wherein the plurality of scoring elements is positioned circumferentially behind the cutting edge in the cutting direction.

12. The drill bit of claim 9, further comprising a cutting body coupled to the shank, the cutting body including a central boss, a sidewall extending circumferentially around the central boss, and a plurality of cutting teeth coupled to the sidewall and arranged sequentially thereon about the central boss.

13. The drill bit of claim 12, wherein the plurality of cutting teeth extends upwardly along the longitudinal axis by a first amount, and wherein the plurality of scoring elements extends upwardly along the longitudinal axis by a second amount greater than the first amount to extend beyond the plurality of cutting teeth.

14. The drill bit of claim 12, wherein the plurality of scoring elements is configured to contact the workpiece before the plurality of cutting teeth during the cutting operation.

15. The drill bit of claim 12, wherein the cutting edge is formed of carbide.

16. The drill bit of claim 12, wherein the cutting path is further defined radially between the central boss and the sidewall.

17. A drill bit comprising:

a shank defining a longitudinal axis;

a plurality of cutting teeth arranged about the longitudinal axis;

a plurality of gullets arranged about the longitudinal axis and positioned between adjacent cutting teeth of the plurality of cutting teeth;

a tip coupled to the shank and configured to contact a workpiece during a cutting operation; and a plurality of scoring elements positioned radially between the tip and the plurality of cutting teeth, wherein at least one of the plurality of scoring elements extends along the longitudinal axis beyond the plurality of cutting teeth in a direction away from the shank to contact the workpiece before the plurality of cutting teeth during the cutting operation.

18. The drill bit of claim 17, wherein the plurality of scoring elements is configured to remove material from a workpiece along a cutting path extending about the tip during the cutting operation, and wherein the tip is positioned outside of the cutting path and extends along the longitudinal axis beyond the plurality of scoring elements in the direction away from the shank to contact the workpiece before the plurality of scoring elements during the cutting operation.

19. The drill bit of claim 18, wherein one or more of the plurality of cutting teeth is formed of carbide.

* * * * *